Inventors
R.C. Simmonds, Jr.
P.G. Rumball
R.V. Brophy
By their Attorney
Scott R. Foster

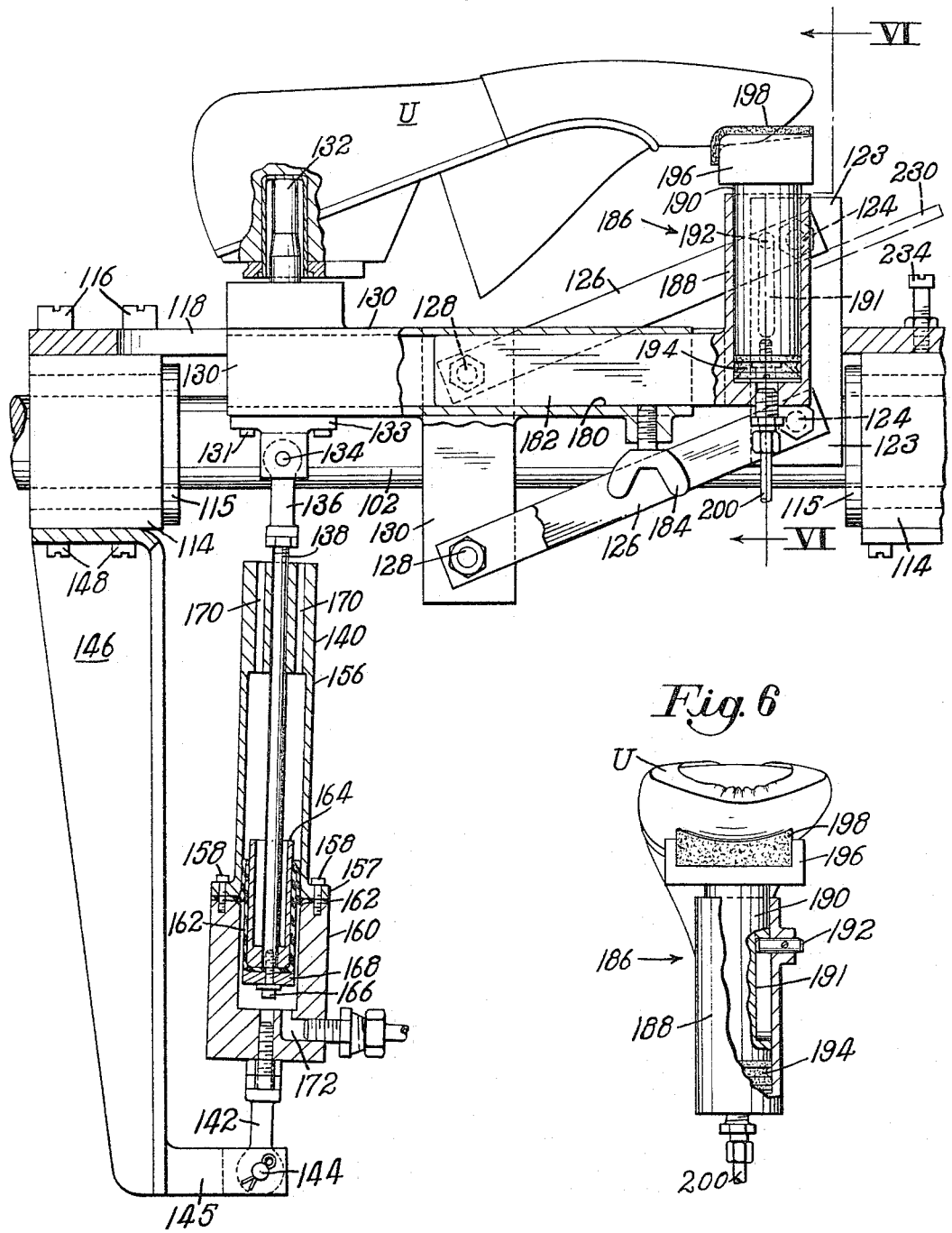
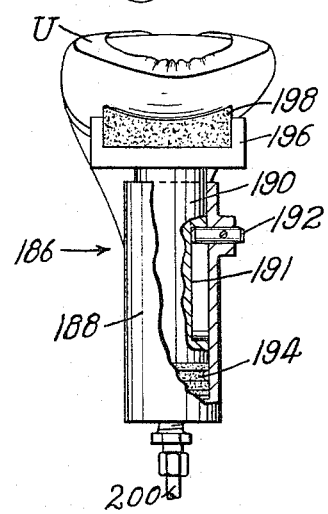

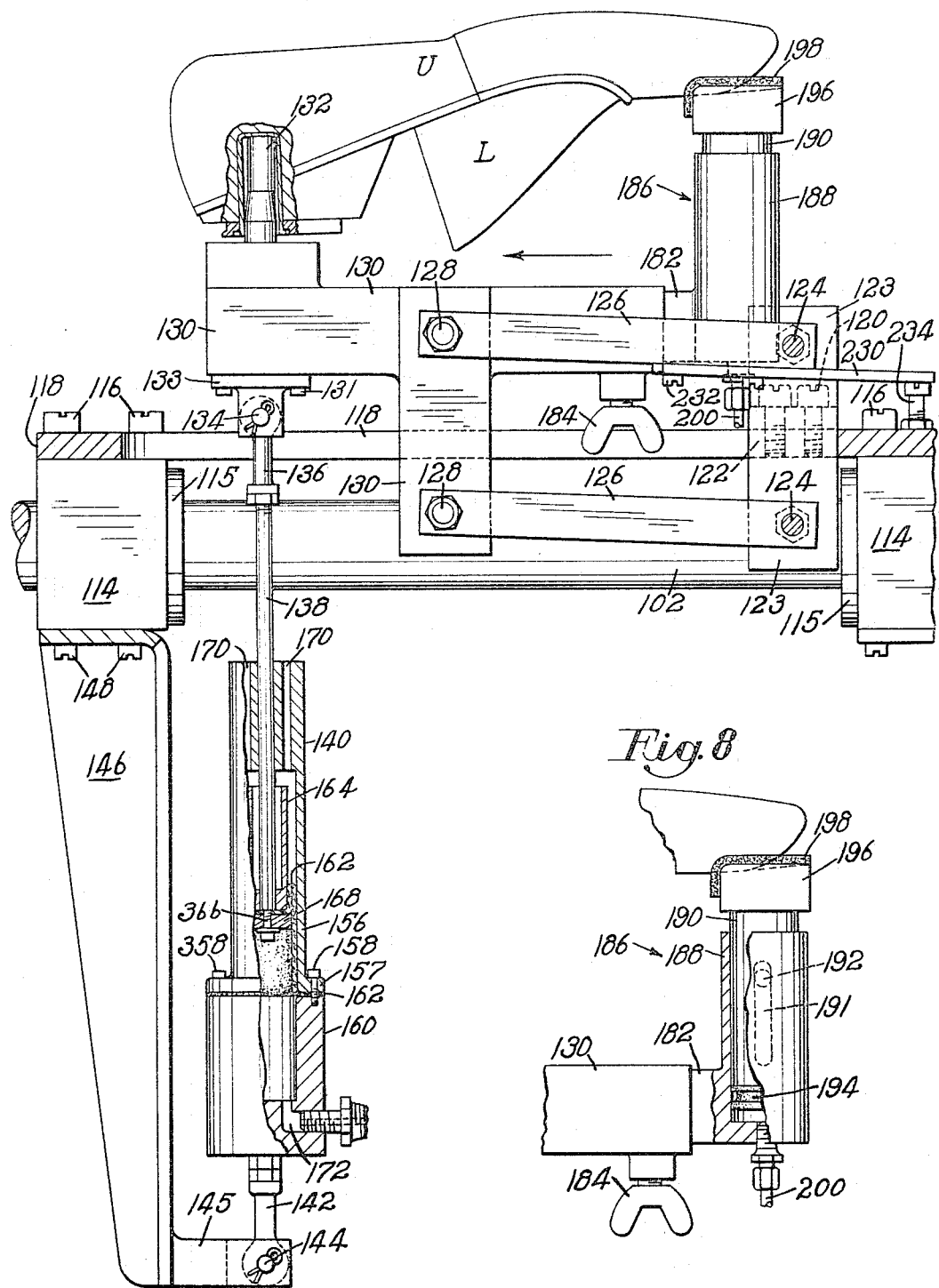

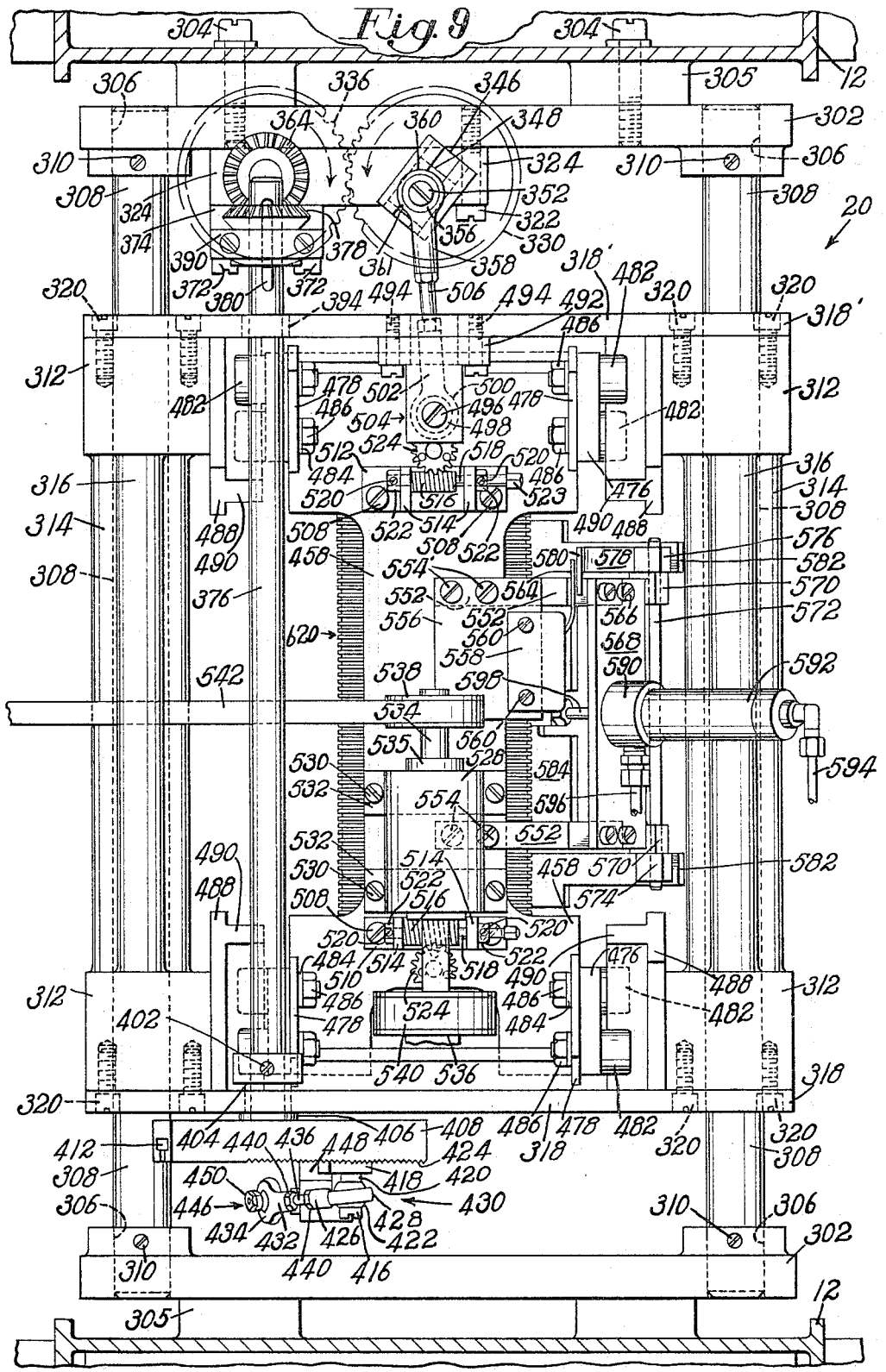

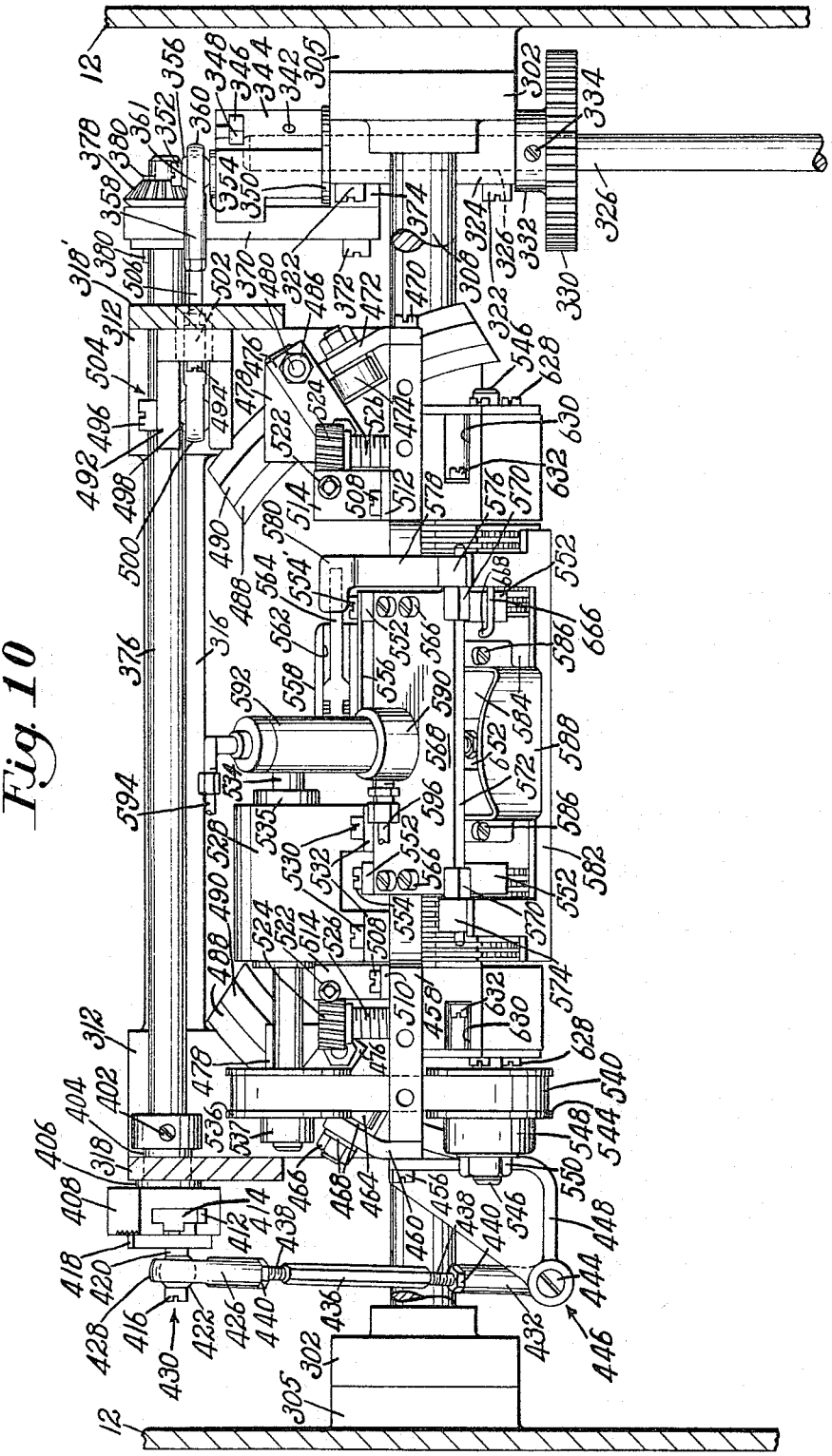

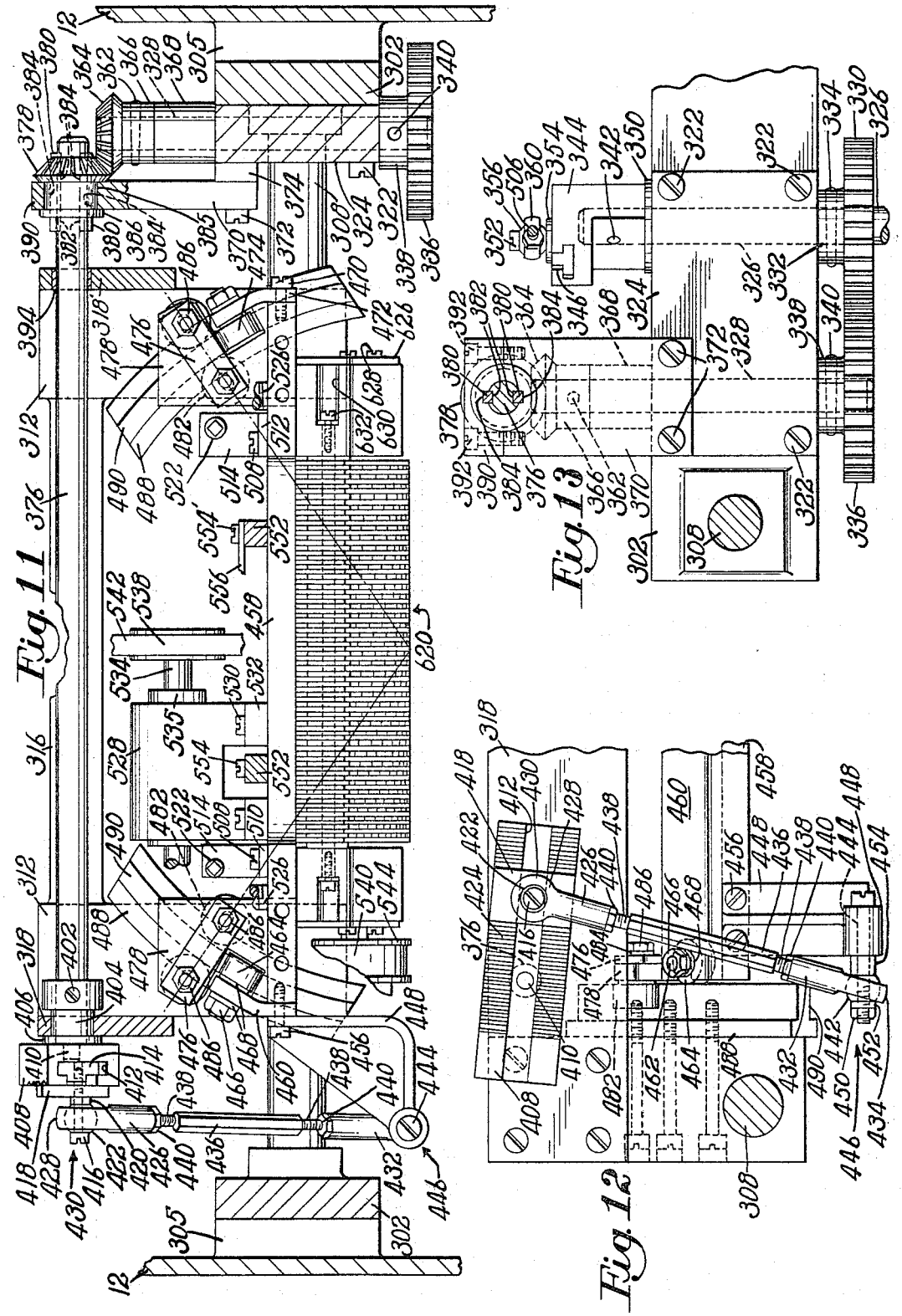

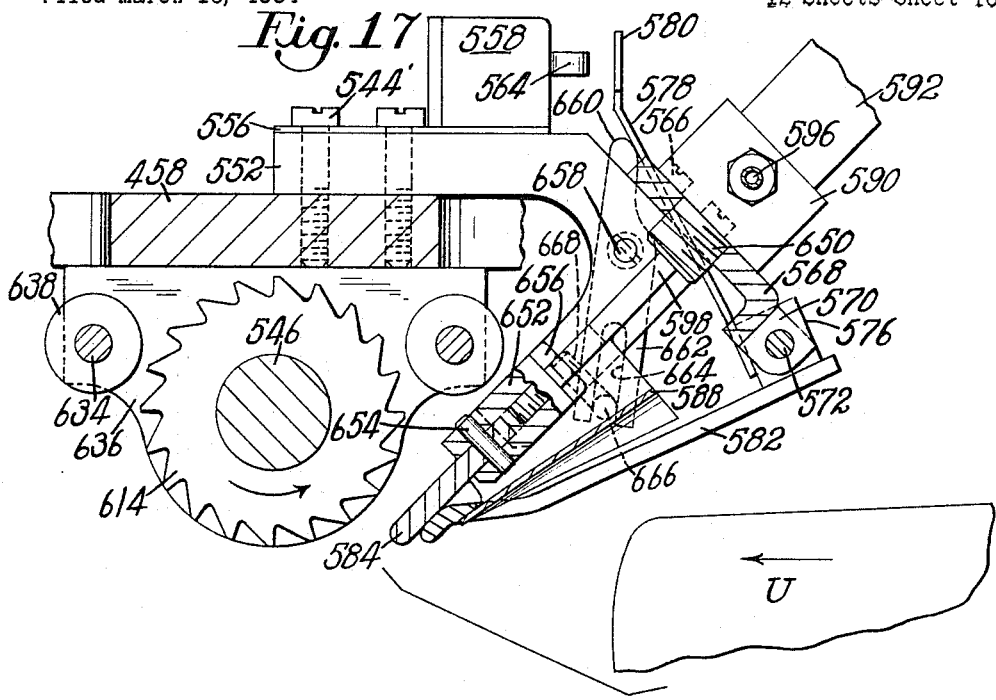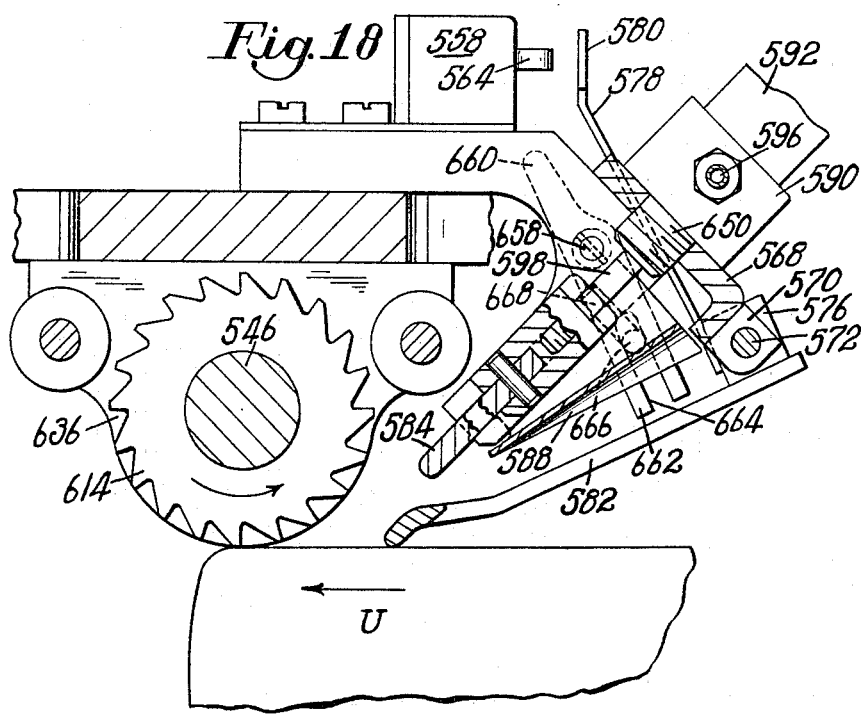

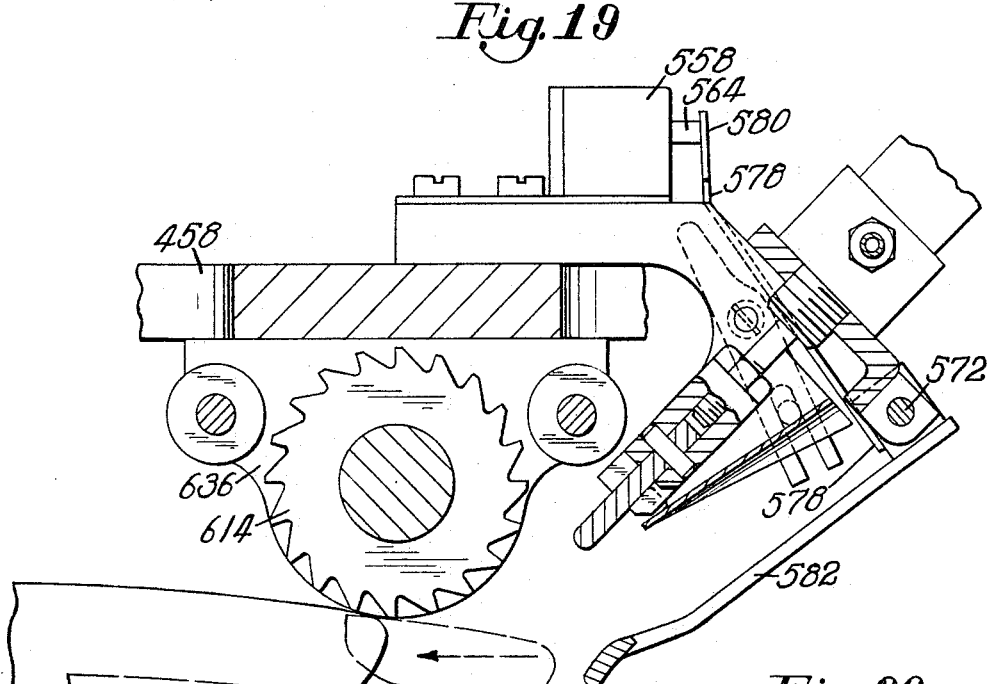
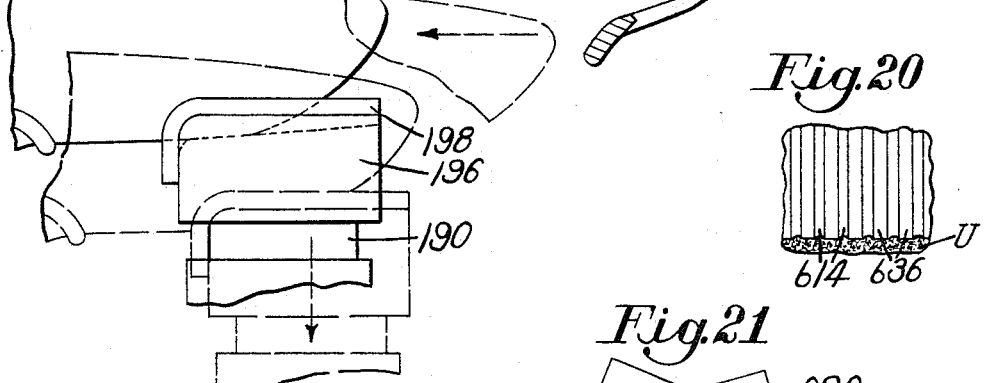
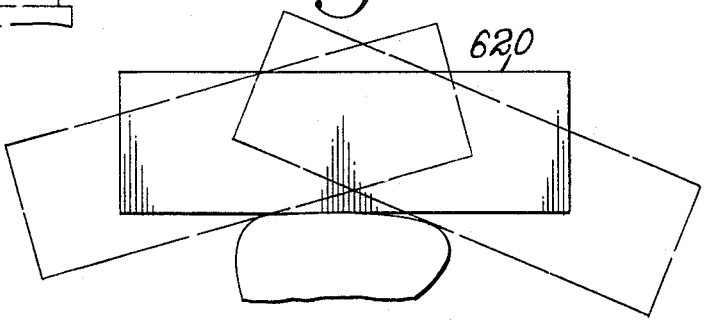
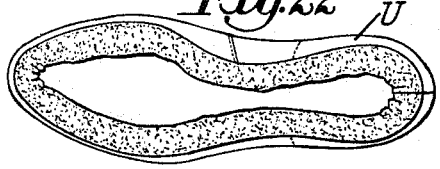

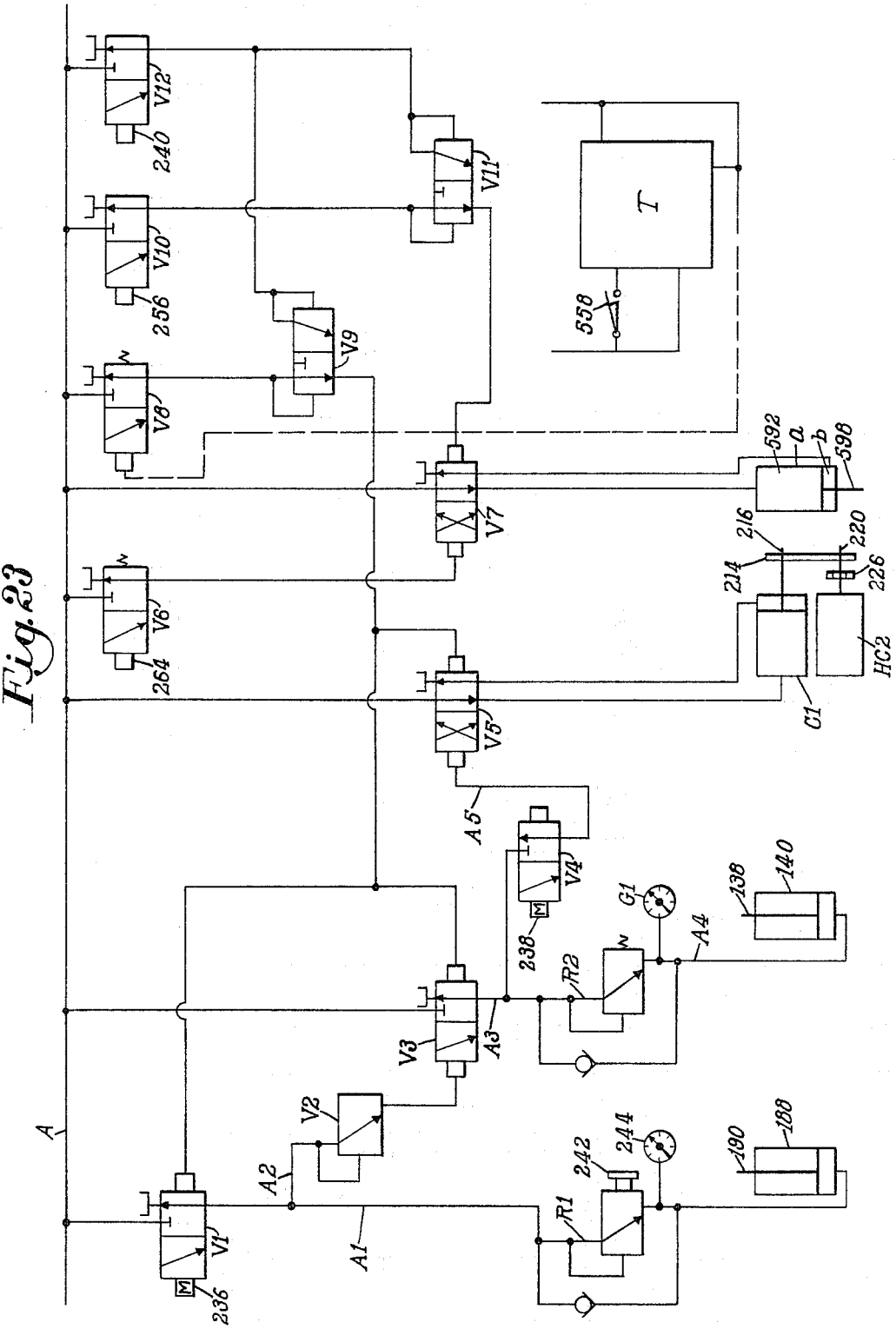

United States Patent Office 3,267,705
Patented August 23, 1966

3,267,705
AUTOMATIC ROUGHENING MACHINES
Robert C. Simmonds, Jr., Topsfield, Paul G. Rumball, Beverly, and Robert V. Brophy, West Gloucester, Mass., assignors to United Shoe Machinery Corporation, Flemington, N.J., and Boston, Mass., a corporation of New Jersey
Filed Mar. 16, 1964, Ser. No. 352,009
11 Claims. (Cl. 69—6.5)

This invention relates to machinery for manufacturing footwear and, more particularly, to a mechanism by which an upper secured to an insole on a last is roughened prior to being treated with cement in preparation for the application of an outsole thereto.

In the manufacture of shoes in which the outsole is secured by the use of cement or other adhesive to the upper, it is necessary that the portion of the upper which receives the cement be roughened. Heretofore this step has been performed manually, as by holding and moving the unfinished shoe against a roughening wheel.

A general object of the invention is to provide a mechanism by which the marginal portions of a lasted upper may be uniformly roughed so that the leather will readily accept the adhesive cement.

A more specific object of the invention is to provide a roughening machine which will rapidly, uniformly and efficiently rough the marginal portion of the lasted upper automatically, obviating the need for hand roughing. The invention also comprises such other objects, advantages and capabilities as will later more fully appear and which are inherently possessed by the invention.

To this end there is provided an automatic roughing machine having a drum mounting and driving mechanism which simultaneously produces rotational, reciprocating and rocking movements of a roughening drum. A shoe on a last is automatically moved horizontally below the abrading drum. The drum rides along the bottom contour of the shoe, being guided by gauge means touching the shoe bottom. The roughening drum in rotating about a horizontal axis, reciprocating along that axis, and rocking about an axis normal to that about which it rotates, imparts to the entire lasted margin an efficient and uniform roughening.

The above and other features of the invention, including novel details of construction and combinations of parts, will now be described in the following specification and will be pointed out in the appended claims. It will be understood that the particular machine embodying the invention is shown by way of illustration only and not as a limitation of the invention. The principles and features of this invention may be employed in varied and numerous embodiments without departing from the scope of the invention.

In the drawings,

FIG. 5 is a sectional view of the last support portion of the shoe carriage assembly, taken substantially along line V—V of FIG. 2 and showing a shoe in its initial position in the machine;

FIG. 6 is a detail side elevation of the toe rest portion of the last support taken substantially along line VI—VI of FIG. 5;

FIG. 7 is a front elevation of the last support, partly in section and showing the shoe in the raised position prior to being operated upon;

FIG. 8 is a detail front elevation, partially in section, of the toe rest portion of the last support;

FIG. 9 is a plan view of the roughening drum assembly;

FIG. 10 is a side elevation, showing the roughening drum assembly with some parts omitted for clarity;

FIG. 11 is a side elevation, similar to FIG. 10 and showing another portion of the roughening drum assembly, but with some additional parts omitted for clarity;

FIG. 12 is a detail front elevation of parts of the oscillating mechanism for the roughening drum assembly;

FIG. 13 is a detail front elevation of parts of the reciprocating and oscillating mechanisms for the roughening drum assembly;

FIG. 17 is a sectional detail front view of a gauging mechanism;

FIG. 18 is a sectional detail view similar to FIG. 17 but showing the operative parts in their positions during the roughing operation;

FIG. 19 is a sectional detail view similar to FIG. 18 but showing a shoe at the completion of the roughing operation, including a phantom position of the shoe to indicate its movement;

FIG. 20 is a detail elevational view of the leather of an upper being engaged by the roughening drum cutters and gauge vanes;

FIG. 21 is a diagrammatic illustration of the reciprocating and oscillating movement of the drum over the bottom of the shoe during a roughing operation, including phantom positions to show the limits of travel of the drum;

FIG. 22 shows the margin of an upper after having been operated upon by the illustrated machine; and FIG. 23 is a diagram of the pneumatic system of the machine showing by a broken line its cooperation with an electrical switch and timer circuit.

General organization

Figure 1:
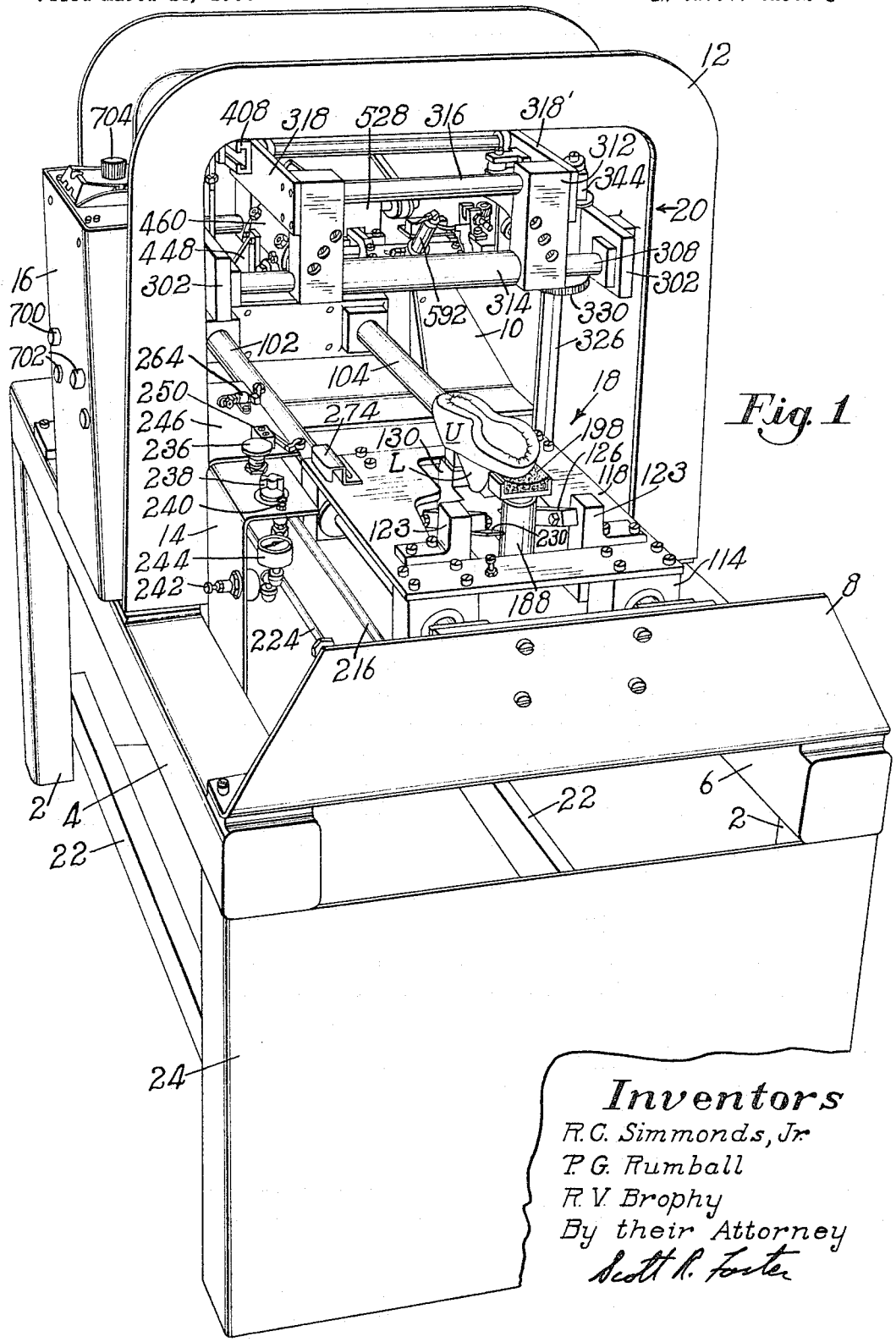
FIG. 1 is a perspective view of a preferred embodiment of the invention showing a shoe in position prior to being operated upon.

Referring to FIG. 1, there is shown a preferred embodiment of the machine comprising post members 2 supporting a front (as viewed by an operator) frame member 4 and a back frame member 6. A right side shoe carriage frame member 8 and a left side shoe carriage frame member 10 are fixed to the front and back frame members 4, 6. An inverted substantially U-shaped frame member 12 is mounted on the front and back frame members 4, 6. A control mounting 14 is fixed to the front frame member 4 and a control panel 16 is fixed to the inverted U-shaped frame member 12. A shoe carriage, generally indicated 18, is mounted between the right and left side shoe carriage frame members 8, 10. A roughening drum assembly, generally indicated 20, is disposed within the upper region of the inverted U-shaped frame member 12. Additional frame members, such as front and back beams 22, provide additional structural rigidity. Side plates 25 afford protection for working parts of the machine.

Shoe carriage

The shoe carriage 18 will best be seen in FIGS. 2–8. Its purpose is to receive a partially fabricated shoe upon a last and transport the shoe into engagement with the abrading drum. The shoe carriage 18 is movable toward and away from the roughening drum upon rods 102, 104 received at the right side of the machine in a rod retainer plate 106 (FIGS. 2, 3 and 4) which is attached by screws 108 to the right side shoe carriage frame member 8. A pair of set screws 110 retain the rods 102, 104 in openings 112 in the rod retainer plate 106. Similar structure supports the rods 102, 104 at the left side of the machine (FIG. 1).

For the purpose of supporting the carriage 18 upon the rods 102, 104 there are slidably disposed upon the rods 102, 104 carriage plate support blocks 114, having low friction sleeves 115, to which is secured by screws 116 a carriage plate 118. Attached to the carriage plate 118 by screws 120 (FIGS. 2 and 3) are last support blocks 122 having lugs 123 which receive bolts 124. Pivotally mounted upon the bolts 124 are ends of last support arms 126. Spacer discs 121 are disposed between the lugs 123 and the last support arms 126, and lock nuts 125 secure the bolts 124 in place. The other ends of the last support arms 126 are pivotally mounted in the same manner upon bolts 128 received in a last support 130. A last support pin 132 (FIGS. 5 and 7) is mounted upon the last support 130 for receiving a last L with an upper U thereon.

Means for elevating the shoe carriage is shown in FIGS. 5 and 7. Its purpose is to position the lasted shoe vertically for engagement with the roughening drum. A block 133 is fixed to the underside of the last support 130 by screws 131. Pivotally attached to the block 133 by a pin 134 is a rod 136. The rod 136 threadably receives one end of a vertically movable piston rod 138, the other end of which is disposed in a last support cylinder 140 (FIGS. 5 and 7). A rod 142 is connected to the underside of the last support cylinder 140 and is further connected by a retaining pin 144 to a lug portion 145 of a support member 146 which is affixed by screws 148 to the left side support blocks 114.

The raising and lowering of the last support 130 is accomplished by the last support cylinder 140 which includes an upper cylinder 156 having a flange portion 157 connected by screws 158 to a lower cylinder 160. Held between the flange portion 157 of the upper cylinder 156 and the lower cylinder 160 is a flexible diaphragm 162. Fitted about the lower end of the piston rod 138, as seen in FIG. 5, is a sleeve 164 open at one end. The cylinder end of the piston rod 138 threadedly receives a screw 166 which retains a piston 168. Held between the closed end of the sleeve 164 and the piston 168 is the central portion of the flexible diaphragm 162. Passageways 170 connect the interior of the upper cylinder 156 with the atmosphere. A passageway 172 connects the interior of the lower cylinder 160 with a source of air under pressure.

A toe rest, generally designated 186, is provided for supporting the toe portion of the lasted shoe and for locking the last upon the last support pin 132. The position of the toe rest 186 is adjustable lengthwise of the last. To this end a cavity 180 (FIG. 5) in the last support 130 receives a telescoping portion 182 of the toe rest 186. The telescoping portion 182 is retained in the cavity 180 by a winged set screw 184. A cylinder mounting portion 188 of the toe rest 186 extends upward and at right angles to the telescoping portion 182. A toe rest piston 190 is slidably disposed in the cylinder mounting portion 188. A slot 191 (FIGS. 5, 6 and 8), disposed in the toe rest piston 190, receives a pin 192 fixed to the wall of the cylinder mounting 188. Fixed to the lower end of the toe rest piston 190 is a piston head 194; fixed to the upper end of the toe rest piston 190 is a toe pad block 196 having mounted thereon a toe pad 198 of resilient material for supporting the toe of a shoe to be roughened. Pressurized air is supplied to the bottom of the cylinder 188 by a line 200 from a source not shown.

Figure 2:
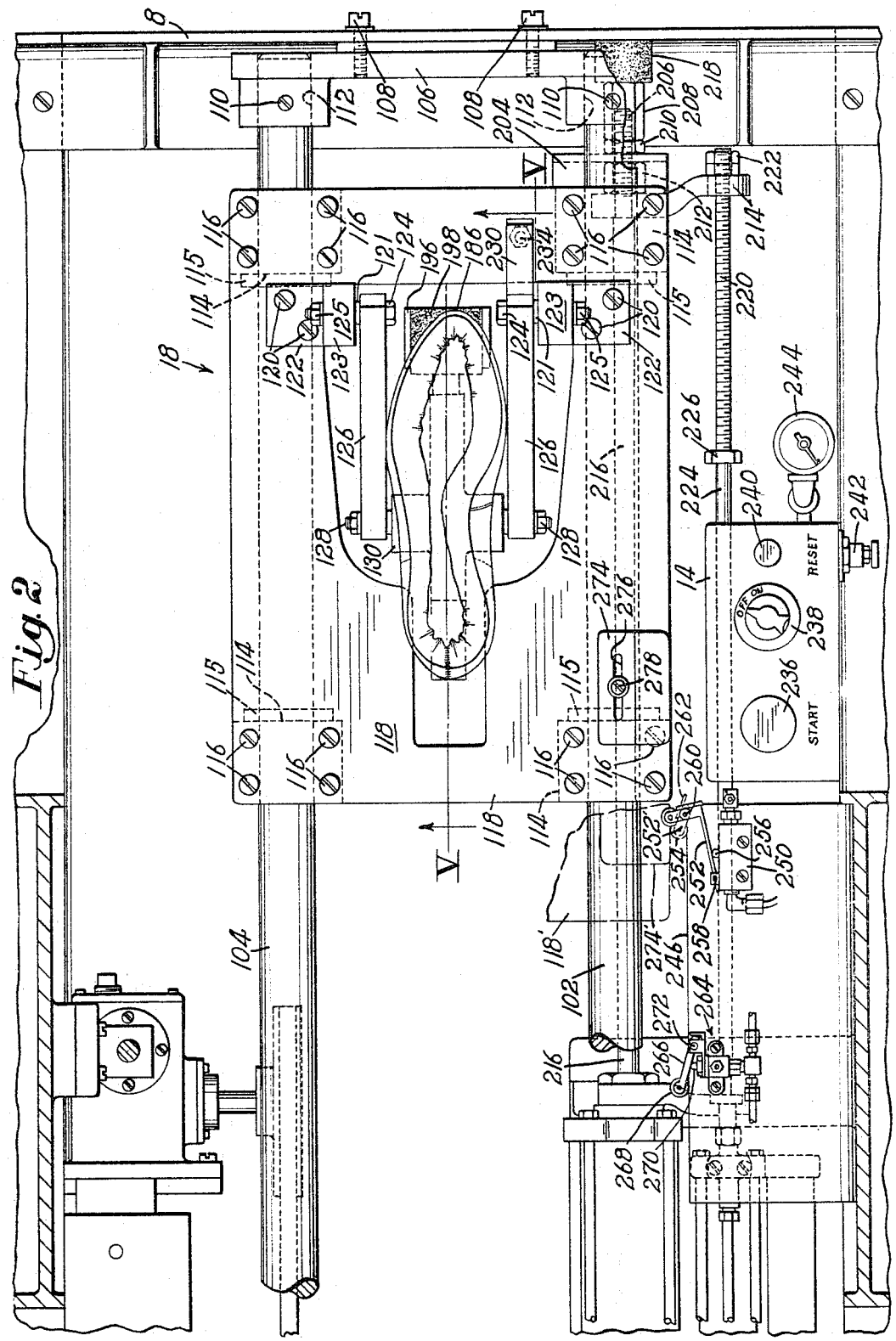
FIG. 2 is a plan view of a shoe carriage assembly of the machine with some parts broken away and some parts in phantom positions, showing a shoe in position prior to being operated upon.
Figure 3:
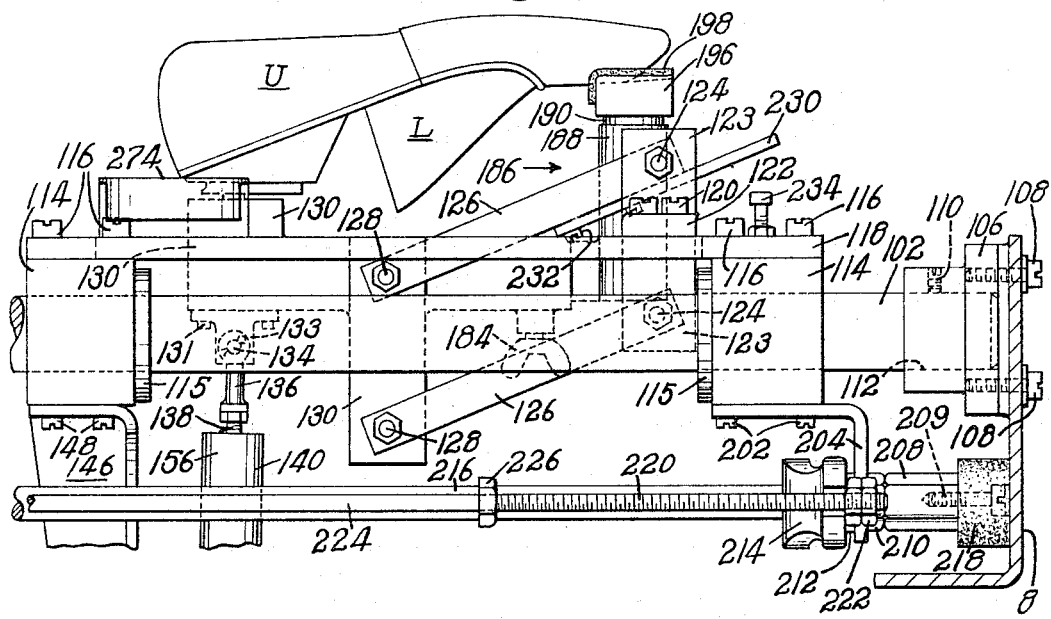
FIG. 3 is a front elevation of a portion of the shoe carriage assembly, showing a shoe in its initial position in the machine.
Figure 4:
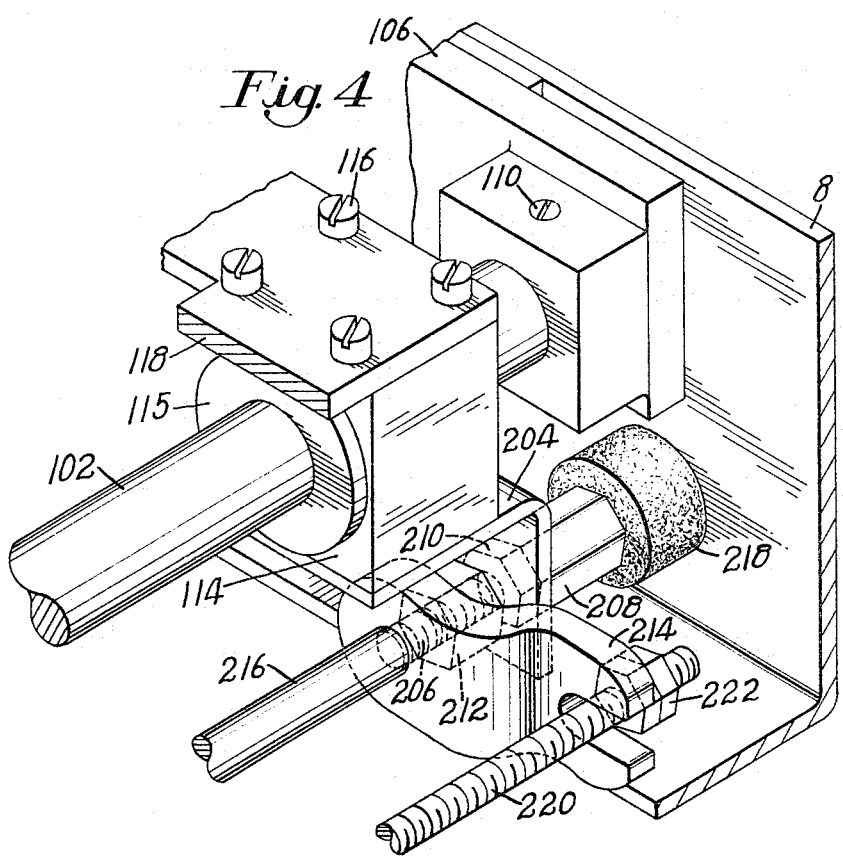
FIG. 4 is a perspective detail view, showing a portion of the shoe carriage assembly.

As will be more fully described hereinafter, the shoe carriage 18 moves toward and under the roughening drum at two speeds, making a rapid approach toward the drum and then a slower movement while in contact with the drum, followed by a rapid movement back to its starting point. Means is provided for moving the carriage, effecting the change in speed, and for cushioning the termination of the return stroke. For this purpose there is attached to one of the support blocks 114, by screws 202, an L-shaped member 204 (FIGS. 3 and 4). A threaded member 206 (FIGS. 2 and 4) passes through the L-shaped member 204 and threadedly engages an elongated nut 208 and a lock nut 210 to the right of the L-shaped member 204 and a spacer nut 212, a bifurcated lug 214 and a shaft 216 to the left of the L-shaped member. Thus, axial movement of the shaft 216 is transmitted to the carriage by the L-shaped member 204. Attached to the elongated nut 208 by a screw 209 (FIG. 3) is a stop 218 of resilient material axially alined with the shaft 216 and threaded member 206 and adapted to cushion the return stroke of the shoe carriage 18. The opposed segments of the bifurcated lug 214 are disposed about a threaded shaft 220 upon one end of which are located a pair of stop nuts 222 adapted to be engaged by the bifurcated lug 214. The threaded shaft 220 is integral with a non-threaded shaft portion 224 (FIGS. 1 and 3) and at the end of the threaded shaft 220 toward the non-threaded portion 224 is disposed a third stop nut 226. The positions of the stop nuts 222, 226 are selectively adjustable along the threaded shaft 220. As will be made apparent below, the position of the stop nut 226 determines the point at which the speed of the carriage 18 is reduced, while the stop nuts 222 afford positive stops for the return stroke of the carriage.

Mechanical means is provided for stopping the vertical travel of the shoe carriage prior to its lateral movement toward the drum. It comprises a limiting arm 230 (FIGS. 2, 3 and 5) attached to one of the last support arms 126 by a screw 232 (FIGS. 3 and 7) and disposed to engage an adjustable stop screw 234 retained in the carriage plate 118.

The control mounting 14 (FIG. 2) includes a starting button 236, an "off-on" switch 238, a reset button 240, and a toe rest cylinder air pressure regulating knob 242, the purposes of which will be explained below. In addition, a toe rest cylinder air pressure gauge 244 is provided on the control mounting 14.

A pair of switches 250 and 264 is provided for actuating means for automatically dropping the shoe from the drum at the appropriate time and returning the shoe to its starting position, and for resetting a shoe position sensing device in the drum assembly, as will be more fully explained hereinafter. The switches 250 and 264 are secured to a mounting plate 246 which is attached to the inverted U-shaped frame member 12. The switch 250 has an arm 252 pivotally mounted at one end and having a roller 254 at the other end. A plunger 256 is disposed so as to be engaged by the arm 252 when it is pivoted toward the switch about its pivot point 258. The roller 254 is mounted on a portion 252' of the arm 252 which is pivoted about a point 260. There is an arm 262 attached to one side of the portion 252' of the arm 252. The switch 264 is similar to the switch 250 in that it includes an arm 266 pivotally mounted at one end and having a roller 268 at the other end. A plunger 270 is disposed so as to be engaged by the arm 266 when it is pivoted toward the switch about its pivot point 272.

A cam block 274 is mounted on the carriage plate 118 for the purpose of engaging the above-mentioned switches 250 and 264. The cam block 274 is provided with a slot 276 in which is disposed a positioning screw 278 which holds the cam block on the carriage plate. The position of the cam block 274 is adjustable through the length of the slot 276. Referring to FIG. 2, it may be seen that as the carriage plate 118 travels to the left to a position as at 118', the cam block 274 in position 274' engages the roller 254 of the switch 250. The operation of the switches 250 and 264 will be described below.

The roughening drum assembly

FIGS. 9–16 illustrate the roughening drum assembly 20 which roughens the marginal portion of the lasted upper as it is carried by the heretofore described shoe carriage assembly 18. Primary support for the drum assembly is provided by drum assembly supporting beams 302 which are connected to the upper portion of the legs of the inverted U-shaped frame member 12 by screws 304 passing through bosses 305. The supporting beams 302 have bores 306 which receive drum assembly slide rods 308, the slide rods being secured therein by set screws 310.

The drum is supported for movement widthwise of the shoe by blocks 312 which are slidably disposed upon the rods 308, the blocks common to a single rod being connected by a cylinder 314 which is integral with the slide blocks and disposed around the slide rod. A rod 316, integral with the slide blocks, further connects the blocks common to a slide rod. Blocks 312 toward the front of the machine (bottom of FIG. 9) are connected by a drum assembly plate 318 secured to the blocks by screws 320. Blocks 312 toward the back of the machine are likewise connected by a drum assembly plate 318' secured to the blocks by screws 320.

The drum assembly 20 is caused to reciprocate upon the slide rods 308 by a mechanism now to be described. Connected by screws 322 to one of the drum assembly supporting beams 302 is a block 324 which receives a vertical shaft 326 (FIGS. 11 and 13). A gear wheel 330 having a hub portion 332 is attached to the shaft 326 by means of a connecting pin 334. A second gear wheel 336 having a hub portion 338 is attached to the lower end of a second vertical shaft 328 by a connecting pin 340 and meshes with the gear wheel 330. Mounted on the upper end of the shaft 326 by a connecting pin 342 is an L-shaped slotted member 344 having an inverted T-shaped slot 346 which slidably retains a positioning block 348 (FIGS. 9 and 10). The member 344 rests upon a low-friction washer 350 which in turn rests upon the upper face of the block 324. A screw 352 passes through the slot 346 and threadedly engages the slide block 348. Thus, by tightening down on the screw 352 the positioning block 348 is urged against the upper horizontal surface of the slot 346 and thereby held in place for purposes explained below. A low-friction washer 354 fits around the shank of the screw 352 and rests upon the upper face of the slotted member 344. A ball-shaped washer 356 fits around the shank of the screw 352 and rests upon the upper face of the washer 354 and receives upon its upper face the underside of the head of the screw 352. A rod 358 having one end 360 of an annular configuration is attached to the screw 352 by means of fitting of the annular portion 360 about the ball-shaped washer 356 so as to form a swivel joint 361 (FIGS. 9 and 10). The other end of the rod 358 is attached to the drum assembly, as will be fully explained hereinafter. The lower end of the shaft 326 is connected to an electrical motor (not shown) which, during a roughing operation, imparts rotational movement to the shaft. Such rotational movement causes rotation of the L-shaped member 344 which, through its connection to the rod 358, causes reciprocation of the drum assembly 20, the magnitude of the reciprocation depending upon the placing of the positioning block 348 in the slot 346.

For the purpose of transmitting the rotary movement of the shaft 328 for later conversion to an oscillating movement of the drum assembly, there is mounted on the upper end of the shaft 328 by means of a connecting pin 362 (FIG. 11) a gear 364 having a hub 366. A spacer sleeve 368 is disposed between the hub 366 and the upper face of the block 324. A support member 370 is attached to the block 324 by screws 372 which also retain a spacer piece 374 between the support member 370 and the block 324. The support member 370 supports a shaft 376 on one end of which is mounted a gear 378 which meshes with the gear 364.

So that the shaft 376 may reciprocate with the drum assembly but not disturb the position of the gear 378, a pair of keys 380 are located in opposed recesses 382 (FIGS. 11 and 13) in the shaft 376 and in opposed recesses 384 in the annulus of the gear 378. The gear 378 has as integral parts a barrel portion 385, which rest upon the support member 370, and a flange member 386 disposed against the forward face of the support member 370. A top block 390 (FIG. 13) is attached to the upper face of the support member 370 by screws 392 and serves to hold the gear 378 in place. Accordingly, rotational movement of the gear 378 is transmitted through the keys 380 to the shaft 376, but axial reciprocation of the shaft 376 may take place without disturbing the gear 378, inasmuch as the shaft 376, with the recessed keys 380, slides within the recesses 384 of the gear 378. The shaft 376 is further supported in a sleeve bearing 394 in the rear drum assembly plate 318'. On the other end of the shaft 376 there is disposed by means of a set screw 402 a flanged sleeve 404. The sleeve 404 passes through the front drum assembly plate 318 (FIG. 11) and is flush with the front face of the plate 318. The shaft 376 extends beyond the front face of the plate 318 and terminates in a necked-down portion 410 which enters an eccentric block 408 (FIG. 12). A washer 406 is located between the front face of the plate 318 and the rear face of the eccentric block 408 and around the shaft 376 (FIG. 11).

The eccentric block 408 converts the rotary motion of the shaft 376 to a reciprocating motion of an arm in much the same manner that the L-shaped member 344 converts the rotary movement of the shaft 326 to a reciprocating movement of the rod 358. To this end the eccentric block 408 has a T-shaped slot 412 which slidably receives a T-shaped slide block 414. The slide block 414 threadedly receives a screw 416 which has mounted thereon a toothed positioning block 418, a spacer disc 420 and a ball-shaped washer 422 (FIGS. 9 and 11). The positioning block 418 has on its rear face a series of teeth adapted to engage teeth 424 on the forward face of the eccentric block 408. Thus, by loosening the screw 416 the positioning block 418 may be positioned along the slot 412 and held in the desired location by cooperation of the teeth 424 of the eccentric block 408 and the teeth of the positioning block 418 upon tightening of the screw 416. This operation determines the magnitude of the reciprocating movement transmitted by the eccentric block 408.

The eccentric block 408 effects a reciprocating motion which is subsequently converted to a drum oscillating motion. For this purpose a rod 426 having an annulus 428 at one end is connected to the ball-shaped washer 422, its annulus 428 being disposed about the ball-shaped washer so as to form a swivel joint 430. Another rod 432 having an annulus 434 at one end is axially alined with the rod 426 with its annulus 434 (FIG. 12) at right angles to the annulus 428. A connecting link 436 having threaded portions 438 at both ends threadedly engages the rods 426, 432. One of the threaded portions 438 has reverse threads thereon to facilitate closing or opening the distance between the rods 426, 438, and thereby the magnitude of reciprocation, by a single turn of the link 436. A pair of nuts 440 hold the position of the link 436 once set. The annulus 434 contains a ball shaped washer 442 (FIG. 12) which is mounted on a screw 444, forming another swivel joint 446.

To impart the above-described motion to the drum assembly the screw 444 is threadedly retained in a support member 448 which is fixed by screws 456 to a drum plate 458. In addition to the ball-shaped washer 442, there is mounted on the screw 444 a nut 450, a washer 452 and a spacer sleeve 454.

A rail and roller mechanism is utilized to facilitate oscillation of the roughening drum in the roughening drum assembly. Accordingly, there is attached to the front face of the drum plate 458 by the screws 456 a roller holder 460 which receives a rotatably mounted roller 464. A nut 466 is disposed to lock the roller 464 in place. A pair of washers 468 are disposed, one between the roller 464 and the roller holder 460, and one between the roller holder 460 and the nut 465. On the rear face of the drum plate 458 screws 470 (FIGS. 10 and 11) retain another roller holder 472 which receives a roller 474 in the same manner as the holder 460 receives the roller 464. Four roller support plates 478 are mounted on the drum plate 458 as shown in FIG. 9. A roller plate 476 is attached to each roller support plate 478. Each roller plate 476 receives two rollers 482. Washers 484 and nuts 486 are disposed to lock the rollers 482 in place, the rollers 482 being supported by the roller plates 476 and the roller support plates 478. The rollers 482 are disposed in rolling relationship with raceways 488 which are mounted on the slide blocks 312 and which have a raised rail 490. Each roller plate 476 is arranged so that its two rollers 482 are on opposite sides of the rail 490. The roller plates 476 are in axial alinement with the radius of a circle defined by the curvature of the raceways 488 (see FIG. 11). The rollers 464 and 474 are arranged to roll upon the edge of the rail 490. Thus, it may be seen that the raceways 488 support the drum plate 458 within the slide blocks 312.

To receive the reciprocating motion of the rod 358, the transmitting of which was described above, a bifurcated T-shaped support member 492 (FIGS. 9 and 10) is affixed to the rear drum assembly plate 318' by means of screws 494 and receives a screw 496 on which is mounted a ball-shaped washer 498. The ball-shaped washer 498 receives an annulus 500 comprising one end of a rod 502 so as to form a swivel joint 504. A threaded connecting link 506 connects the rod 502 with the rod 358 in the same manner as the connecting link 436 connects the rods 426, 432, described above. Accordingly, movement of the rod 358 in a direction parallel to the slide rods 308 causes like movement of the support member 492 and, through its attachment to the drum assembly plate 318', movement of the blocks 312.

To facilitate the setting of the height of the cutters in the roughening drum there are mounted upon the drum plate 458 by means of screws 508 two brackets 510, 512 (FIGS. 9, 14 and 15) each of which has a pair of upright lugs 514 which retain a worm gear 516. Each worm gear 516 is integral with a non-threaded axial stem 518 which is held in position by set screws 520 in a pair of locking nuts 522. Each stem 518 has at one of its ends an enlarged non-circular head 523. A gear 524 having a threaded shaft 526 received in the drum plate 458 meshes with each worm gear 516. Thus, by applying a wrench to the heads 523 and rotating the stems 518, the worm gears 516, restrained from linear movement relative to the brackets 510, 512, are caused to rotate the gear 524 for the purpose of adjusting the height of the cutters in the roughening drum as will be more fully explained below.

A bearing block 528 supporting a sleeve bearing 535 and having a flanged housing is mounted upon the drum plate 458 by means of screws 530 passing through the flanges 532 for the purpose of supporting a shaft 534. The shaft 534 has mounted thereon a pair of driving wheels 536 (FIGS. 9 and 10) and 538 (FIG. 11) carrying continuous belts 540, 542. The driving wheel 536 has a hub portion 537. The belt 540 is wound about a follower wheel 544 (FIG. 10) fixed upon one end of a shaft 546 and having a hub portion 548. A lock nut 550 is used to adjustably maintain the follower wheel 544 in alinement with the driving wheel 536. The belt 542 is wound about the driving wheel of an electrical motor (not shown) from whence a rotary motion is imparted to the shaft 534.

For supporting a shoe position sensing means a pair of arms 552 are secured to the drum plate 458 by screws 554, 554' (FIGS. 9, 10, 11 and 17). The screws 554' further engage a supporting plate 556 which supports an electrical switch 558 by means of screws 560. The switch 558, on one face, has a leaf arm 564 (FIGS. 9, 10 and 17). The supporting arms 552 have attached to their upper surfaces by means of screws 566 a plate 568 having bored lugs 570 integral therewith. A pivot pin 572 is received in the bored lugs 570 and has mounted on one of its ends a block 574 and on the other of its ends a block 576 having an arm 578 with a face 580 in a plane parallel to that of the leaf arm 564. Attached to the blocks 574, 576, as by brazing, is a brush plate 582 which is accordingly pivoted about the pivot pin 572. The supporting arms 552 are provided with slots along their opposing faces which receive a gauge base plate 584 (FIGS. 10 and 17–19). Mounted on the gauge base plate 584 by means of screws 586 (FIG. 10) is a gauge plate 588. The plate 568 has mounted thereon a collar 590 (FIGS. 9, 10 and 17) which retains a double-acting pneumatic cylinder 592 having conduits 594 and 596 (FIGS. 9 and 10) connecting the cylinder 592 to sources of air under pressure. A piston rod 598 extends from the lower end of the cylinder 592 and is attached to the gauge base plate 584. Accordingly, movement of the piston rod 598 into the cylinder 592 pulls the gauge base plate 584 upwards, away from contact with the brush plate 582 as will be explained in some detail below.

Figure 14:
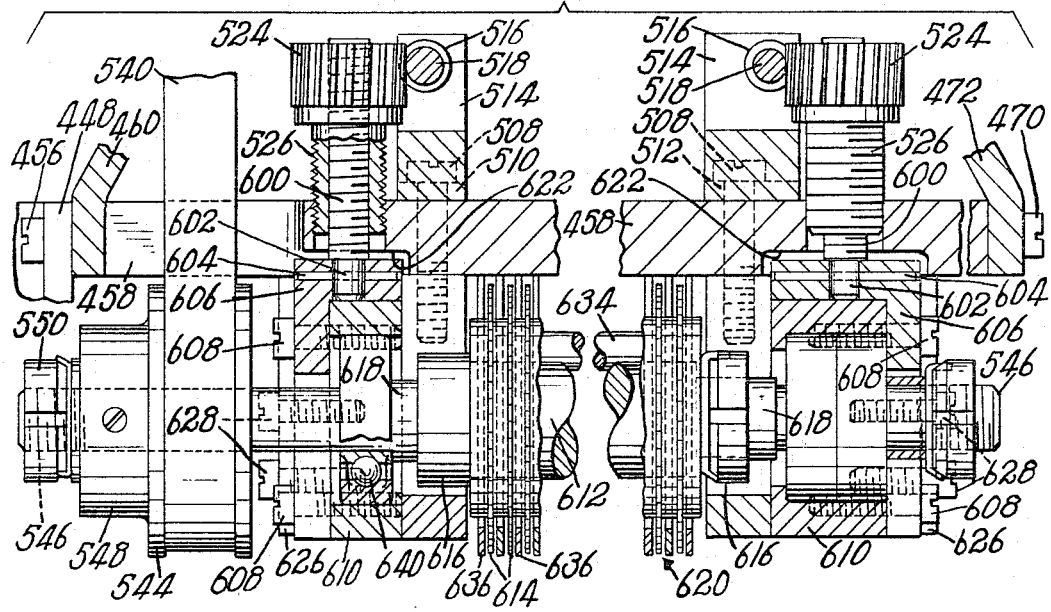
FIG. 14 is a sectional detail side view of a height adjustment mechanism for the cutter discs of the roughening drum assembly.
Figure 15:
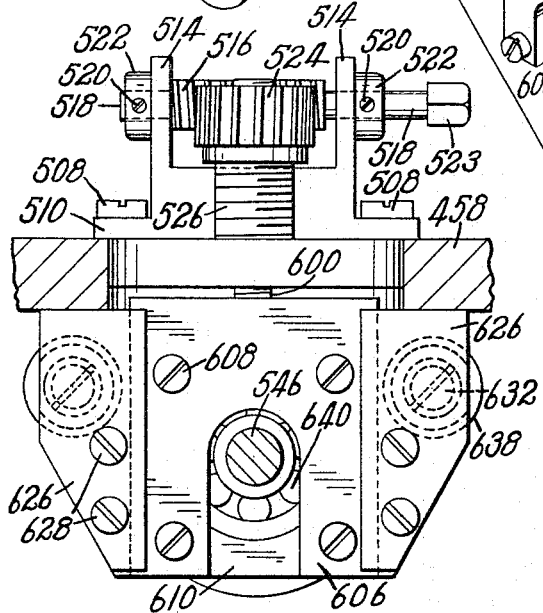
FIG. 15 is a detail front elevation of the height adjustment mechanism for the cutter discs of the roughening drum assembly.
Figure 16:
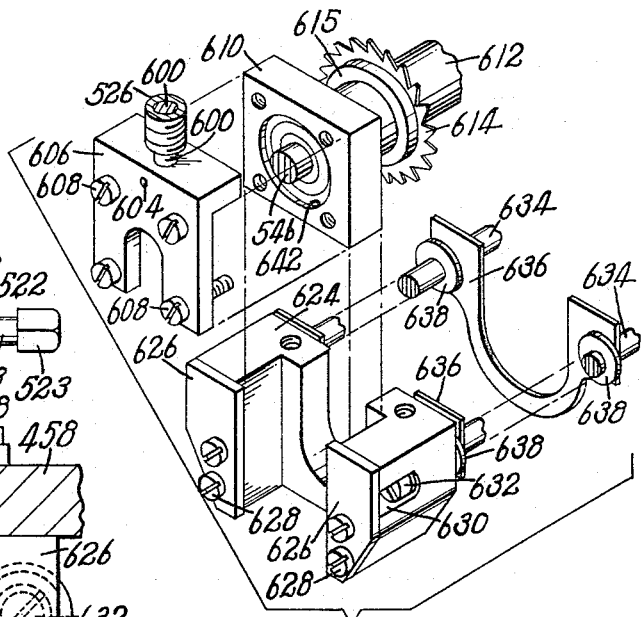
FIG. 16 is an exploded perspective view of elements of a portion of the roughening drum assembly.

The cutter height adjusting mechanism, alluded to above, will now be described in detail. Referring to FIGS. 14, 15 and 16, it may be seen that the threaded shafts 526 of the gears 524 are mounted upon a smaller threaded portion 600 which is necked-down to a non-threaded pin portion 602. The threaded portion 526 is rotatable upon the threaded portion 600 and is threadedly received by the drum plate 458. Each pin 602 receives a connecting pin 604 by means of which there is connected to the pin 602 a cutter end block 606. Screws 608 connect the cutter end block 606 to a cutter shaft support block 610 which receives the shaft 546, hereinafter referred to as the cutter shaft, having an enlarged portion 612 on which are mounted a series of cutter discs 614 and spacer discs 615. A pair of locking nuts 616 are fitted about an intermediate enlargement 618 of the cutter shaft 546 and serve to maintain the assembly of cutter discs 614 and associated pieces, designated generally as 620 and referred to as the roughening drum, in place upon the cutter shaft 546. The upper portion of each cutter end block 606 is received in a recess 622 in the underside of the drum plate 458. The remainder of the cutter end block 606 and the cutter shaft support block 610 are received in a gauge vane end block 624 which is secured by the screws 508 to the underside of the drum plate 458. End plates 626 are connected by screws 628 to each gauge vane end block 624. Recesses 630 in the gauge vane end blocks 624 receive screws 632 which serve to connect a pair of gauge vane support rods 634. The gauge vane support rods 634 support a series of U-shaped gauge vanes 636 and spacer discs 638. Roller bearings 640 retained in an annular track 642 in the cutter shaft support block 610 facilitate rotation of the cutter shaft 546. The cutter discs 614 and the gauge vanes 636 are disposed alternately along the abrading drum 620. As may be seen in FIG. 14, the cutter discs 614 are recessed slightly relative to the gauge vanes 636. The cutter discs rotate within the drum while the gauge vanes are stationary.

In order to change the distance between the lower edge of the cutting discs and the lower edge of the gauge vanes, the operator applies a wrench to the enlarged head 523 of the stem 518 causing rotation of the worm gear 516 and therefore the gear 524 as noted previously. Rotation of the gear 524 effects rotation of the threaded shaft 526 which in turn effects vertical movement of the interior shaft 600. The interior shaft 600 is threaded so as to move axially counter to the shaft 526. The connecting pin 604 prevents the shaft 600 from rotating so as the shaft 526 is screwed into the drum plate the shaft 526 is caused to enter further the drum plate 458 and the shaft 600 is caused to be moved vertically upward, thereby raising the cutter end block 606 and so the cutter shaft 546. The gauge vane end block 624 is held stationary against the drum plate 458. Accordingly, movement of the cutter end block 606 changes the relative positions of the cutter discs 614 and the gauge vanes 636. The operation must be performed on each cutter end block 606.

FIGS. 17–19 illustrate the structure and operation of the shoe position sensing means, which will now be described in detail. As may be noted in FIG. 17, the collar 590 of the pneumatic cylinder 592 is attached to the plate 568 by means of a necked-down threaded portion 650 which threadedly engages the plate 568. The piston rod 598 is threaded at its lower end and is threadedly connected to a base member 652 of the gauge base plate 584. A connecting pin 654 serves to connect the plate 584 to its base member 652. A lock nut 656 is disposed on the threaded portion of the rod 598 and abuts a face of the base member 652.

To control the time at which the arms 578 may make contact with the switch 558, and thereby the time at which the last will drop away from the drum, there is attached by means of a connecting pin 658 to one of the supporting arms 552, a lever 660 having a bifurcated arm 662. The opposed segments of the bifurcated arm 662 form a slot 664 which receives a pin 666 having a right angle portion 668 which is secured to the gauge base plate 584. As may be seen in FIGS. 17–19, the lever 660 holds the arm 578 against the possibility of contact with the leaf arm 564 of the electrical switch 558 until the piston rod 598 is drawn into the cylinder 592. When the piston rod 598 is drawn into the cylinder 592, the gauge base plate 584 is pulled upwards in slots in the supporting arm 552. The base member 652 carries the pin portion 668 with it and so effects a change in the position of the pin 666 from that shown in FIG. 17 to that shown in FIGS. 18 and 19. As the pin 666 moves in the slot 664 the lever 660 is made to pivot about its connecting pin 658 in such a way as to be removed from an obstructing position relative to the arm 578, as shown in FIG. 18. The arm 578 and the brush plate 582 are both attached to the block 576 and so form, in effect, a two-armed lever pivoted about the pivot pin 572. Thus, the movement of the brush plate 582 determines the position of the face 580 of the arm 578 relative to the leaf arm 564 of the switch 558.

Operation

In operation of the machine, the last support 130 is adjusted for the particular length of shoe to be operated upon by manipulation of the winged set screw 184 and the positioning by hand of the rod 182 within the cavity 180. A last, with an upper thereon, is placed upon the last support 130 as shown in FIG. 5 with the last in inverted position and the heel portion disposed upon the last support pin 132 and the toe portion resting on the toe pad 198. The "start" button 236 (FIGS. 2 and 23) is depressed manually. Referring to FIG. 23, it may be seen that by depressing the start button 236, air under pressure from a main air line A is allowed to pass through a starting valve V1, into an air line A1, through a pressure regulator R1, and into the toe rest cylinder 188.

Air under pressure accordingly enters the toe rest cylinder 188 through the passageway 200 (FIG. 5). The air, acting upon the face of the piston head 194 forces the toe rest piston 190 and the toe rest block and pad 196, 198 upwards, causing the toe of the last to move to a position higher than the heel portion. Such movement causes the heel portion of the last to alter its position relative to the last support pin 132 in such a way as to wedge the last against the pin 132 thereby effecting retention of the last upon the last support 130.

Referring again to FIG. 23, it may be noted that the air in the line A1, in addition to entering the cylinder 188, also enters a line A2 and is sent to a sequence valve V2 to pilot operate a three-way valve V3. The valve V3 admits air from the main air line A by way of an air line A3 through an adjustable air pressure regulator R2 having a pressure gauge G1 (not shown except diagrammatically in FIG. 23). By way of an air line A4 air is admitted to the last support cylinder 140.

Air under pressure is accordingly caused to enter the lower portion 160 of the last support cylinder 140 through the passageway 172 (FIG. 5). Air acting upon the piston 168 forces the piston rod 138 upwards from a position shown in FIG. 5 to a position as shown in FIG. 7. The passageways 170 provide atmospheric pressure only on the upper side of the cylinder 140. The flexible diaphragm 162 prevents the escape of air into the upper portion 156 of the last support cylinder 140. The upward movement of the piston rod 138 causes the entire last support 130, including the toe rest 186, to move vertically upward to a position shown in FIG. 7. The relative positions of the toe pad 198 and the last support pin 132 have not been changed by the movement of the last support 130 so that the last is still wedged upon the pin 132.

The arms 126, which retain the last support 130 within the carriage plate 118 pivot about the bolts 124, 129, allowing the last support to move vertically, but maintaining its position centrally of the carriage plate 118. The upward movement of the last support 130 is terminated when the limiting arm 230 engages the stop screw 234 (FIG. 7).

The toe rest cylinder air pressure gauge 244 (FIG. 2) affords an instant determination of the air pressure within the toe rest cylinder 188, which pressure may be regulated by operation of the toe rest cylinder air pressure regulating knob 242. The operator, by using the knob 242 and the gauge 244, can adjust the toe rest cylinder air pressure so that it is sufficiently high to "lock" the last on the last support pin 132, but not so high as to cause distortion of the last support pin. The guide pin 192 (FIG. 6) positioned within the slot 191 assures non-rotational movement of the toe rest piston 190, so that the toe pad 198 remains centrally of the carriage plate 118 and in its proper attitude angularly for subsequent operations.

The shoe, having been raised to a position preparatory to roughing, is now ready for lateral movement under the roughening drum assembly 20. The operator moves the on-off switch 238 to the "on" position to commence lateral movement of the carriage plate 118.

Returning to FIG. 23, it may be appreciated that the air in the line A3 may readily travel to the on-off valve V4. When the operator moves the on-off switch 238 to the "on" position the air from the line A3 is sent through a line A5 to pilot operate a four-way valve V5 which sends air from the main air line A to a pneumatic driving cylinder C1. Air under pressure thus admitted to the pneumatic driving cylinder C1 drives the shaft 216 toward the left side of the machine as viewed in FIGS. 2 and 3. As the rod 216 is driven toward the left side of the machine it carries the L-shaped member 204, and thus the carriage plate 118, along with the bifurcated lug 214, to the left with it. The threaded shaft 220 remains stationary and the bifurcated lug passes axially along the shaft 220 but without engaging the shaft 220.

As the carriage plate is driven to the left the cam block 274 engages the roller 254 of the switch 250. Because of the pivotal mounting of the end portion 252' of the arm 252, the cam block 274 does not, in its travel to the left, cause the arm 252 to depress the plunger 256 and so the switch 250 is not at this point actuated.

The bifurcated lug 214 moves freely along the shaft 220 until it engages the stop nut 226 whereupon the shaft 220–224 is driven to the left, being urged in that direction by the lug 214. The left end of the shaft 224 is connected to a hydraulic brake cylinder HC2 (FIG. 23) which exercises a restraining force on the leftward movement of the shaft 224 and thereby on the shaft 216. The slower movement of the shaft 216 causes a commensurately slower movement of the carriage plate 118 which is connected through the L-shaped member 204 to the shaft 216. Thus, the above-described arrangement of driving and brake cylinders allows rapid movement of the last support to a point just short of the abrasive drum assembly 20, and then effects a slower movement of the shoe past the roughening drum, the slower speed being one suitable for the complete and efficient roughing of the lasted margin.

As the last passes under the roughening drum assembly 20 the last support cylinder 140 affords an air spring beneath the last which maintains the last yieldably against the underside of the drum. Thus, while the last is moving laterally beneath the drum, it will also be moving vertically in small increments sufficient to allow the insole to pass beneath the drum in an unrestricted manner.

Prior to placing the last on the last support, the operator commences the movements of the roughening drum by pressing a "drum rotate" button 700 and a "drum reciprocate" button 702 on the control panel 16 (FIG. 1). The "drum rotate" button 700 energizes a motor (not shown) which effects movement of the continuous belt 542 (FIG. 9). Movement of the belt 542 causes rotation of the wheel 538 which is transferred by the shaft 534 to the wheel 536. The rotation of the wheel 536 causes rotation of the wheel 544 by the action of the belt 540 (FIG. 10). As the wheel 544 rotates, it turns the cutter shaft 546 and so the cutter discs 614. Thus, a rotational movement of the drum is effected in preparation for performing a roughing operation.

Depression of the "drum reciprocate" button 702 energizes a motor (not shown) which serves to rotate the vertical shaft 326 (FIG. 13). The rotation of the shaft 326 imparts a rotational movement to the L-shaped slotted member 344 and thereby a reciprocating motion to the rod 358–506–502, the extent of the reciprocating motion being dependent upon the setting of the positioning block 348 in the slot 346. The degree of width-wise roughening desired for the shoe to be operated upon determines the position at which the positioning block 348 is set within the slot 346. Minor changes may be entered by turning the connecting ling 506 so as to slightly lengthen or shorten the rod 358–506–502. Referring to FIG. 10, it may be seen that reciprocation of the rod 502 is transferred to the side blocks 312 through the support member 492 attached to the drum assembly plate 318'. Accordingly, rotation of the shaft 326 imparts an adjustable reciprocating motion to the entire roughening drum assembly 20, the assembly being moved back and forth along the slide rods 308.

Referring to FIG. 13, it may be seen that the set of gears 330–336 transfers the rotary motion of the shaft 326 to the shaft 328, which rotary motion is in turn transferred through another set of gears 364–378 to the shaft 376. Rotation of the shaft 376 causes rotary movement of the eccentric block 408 (FIG. 12). As the block 408 rotates it imparts a reciprocating motion to the rod 426–436–432, which motion is transferred through the joint 446 and support member 448 to the drum plate 458. The rollers 464, 474, 482, permit the drum plate 458 to move responsive to the rod 432 in directions defined by the raceways 488. The extent of the reciprocating motion effected by the eccentric block 408 is dependent upon the setting of the positioning block 418 on the eccentric block 408. Inasmuch as the movement of the drum 620 effected by the block 408 is a tilting, or oscillating movement, the setting of the positioning block 418 is determined by the location of the featherline of the insole to be roughened. The operator enters a setting which will prevent roughing about the featherline of the insole. Fine changes in the extent of oscillation may be entered by turning of the connecting link 436 so as to lengthen or shorten the rod 426–436–432. The gears 330, 336 afford a timed relationship between the oscillating and the reciprocating motions, so that the maximum tilt occurs at the end of the reciprocating stroke.

With the roughening drum 620 undergoing rotational, reciprocating and oscillating movements, the carriage plate 118 advances the last L into position to be operated upon by the abrading drum. As noted above, contact between the cam block 274 and the roller 254, in advancing the shoe toward the drum, is passive in that the switch is not actuated. As the carriage plate 118 advances farther toward the drum, the cam block 274 strikes the roller 268 of the switch 264. The switch arm 266 is thereby caused to pivot about the pin 272 and to depress the plunger 270, actuating the switch 264. Actuation of the switch 264 causes a valve V6 (FIG. 23) to pilot operate a four-way valve V7 which exhausts side *a* of the pneumatic cylinder 592 and pressurizes side *b*. Air entering side *b* of the cylinder 592, by its action upon a piston in the cylinder, forces the piston rod 598 upward into the cylinder, pulling the gauge base plate 584 away from the brush plate 582 and freeing the arm 578 for movement toward the leaf arm 564, as discussed above.

The heel of the shoe strikes the brush plate 582, which rides upon and then along the bottom of the shoe. The heel margin is then engaged by the stationary gauge vanes 636 and the rotating cutter discs 614. It will be understood that the gauge vanes 636 are stationary in a rotative sense, but are undergoing the reciprocating and oscillating motions of the drum. As alluded to above, the gauge vanes extend downward a small distance farther than the cutter discs, and the distance may be selectively varied (usually not greater than .001 inch). As the leather of the margin presses against the gauge vanes 636 it "puffs up" between them (FIG. 20) and is contacted by the rotating cutter discs 614. As previously mentioned, the last support cylinder 140 acts as an air spring, keeping the bottom of the shoe pressed yieldably against the underside of the roughening drum. The pressure applied by the last support cylinder may be selectively varied by manipulation of the adjustable pressure regulator R2, in conjunction with reference to the air pressure gauge G1 (FIG. 23).

As the shoe passes beneath the drum the leather is subjected to a movement of the cutter discs 614 which is the sum of their rotative motions and reciprocating motions. The oscillating motion of the drum (FIG. 21) assures roughing of the margin to the featherline. The last support cylinder 140 insures that depressions along the shoe length, as in the shank area, are pressed upwardly against the drum.

Referring to FIG. 19, it may be seen that as the toe of the shoe approaches the drum the brush plate 582 "drops off" the toe and is accordingly pivoted downward about the pivot pin 572, causing the arm 578 to pivot so as to bring the face portion 580 against the leaf arm 564. Contact between the leaf arm 564 and the face 580 of the arm 578 closes the switch 558 which actuates an electrical timer T (FIG. 23). A time delay is preset in the timer so as to allow the shoe to move a certain distance before the timer actuates a solenoid valve V8. The time delay input is adjustable through manipulation of a time setter 704 (FIG. 1) and is dependent upon the rate of motion of the shoe carriage for purposes explained below. After the timed interval has expired, the solenoid valve V8 is actuated. Air is sent through the directional valve V9 to pilot operate the three-way valve V3 and the starting valve V1 and the four-way valve V5. The three-way valve V3 exhausts the last support cylinder 140 to drop the shoe from the roughing head. The starting valve V1 is reset, allowing air in the toe rest cylinder 188 to exhaust to the atmosphere, unlocking the last from the last support pin 132. The four-way valve V5 exhausts and pressurizes the pneumatic driving cylinder C1 so as to return the shoe carriage assembly to the starting point.

There is, as noted above, a time interval between the dropping of the brush plate and the removal of the shoe from the operating position. The time delay is preset so as to allow the toe of the shoe to be roughened to its featherline, at which time the shoe drops down out of roughing position. It may be appreciated that if this were not done the air spring properties of the last support cylinder would cause the shoe to "ride up" the left side of the drum as the shoe neared completion of its roughing operation. Such a motion would cause the cutter discs to be applied well beyond the featherline in the tip area, resulting in roughing an area in which roughing is not desired.

When the shoe has dropped to the inoperative position under the drum and is moving back to the right, or toward its starting position, the cam block 274 again engages the roller 254 of the switch 250, this time causing depression of the plunger 256 which operates to activate a valve V10 (FIG. 23). The valve V10 sends air through a directional valve V11 to pilot operate the four-way valve V7. The valve V7 then exhausts air from side b of the pneumatic cylinder 592 and pressurizes side a, thereby to reset the gauge base plate 584. During the return stroke of the shaft 216 the opposed segments of the bifurcated lug 214 travel to the right (FIGS. 3 and 4) until contact is made with the stop nuts 222 on the threaded shaft 220. The stop 218 and the stop nuts 222 should be arranged so that the stop 218 strikes the frame member 8 so as to cushion the contact between the lug 214 and the stop nuts 222.

If at any time during the roughing operation it is desirable to return the shoe to its starting position, the operator may do so by depressing the "reset" button 240. The button 240 activates a valve V12 (FIG. 23) which sends air from the main air line A through the directional valve V9 to the four-way valve V5 to effect carriage return, to the three-way valve V3 to drop the shoe from the roughening drum, and to the starting valve V1 to unlock the shoe. The activation of the valve V12 further sends air through the directional valve V11 to the four-way valve V7 for resetting the gauge base plate 584. Thus, depression of the reset button returns the shoe to the loading position with all components ready for the start of a new cycle of operation.

It may be noted that the last stops its movement at the end of an operative cycle at precisely the same point from which it began. Further, the last is presented to the last support by simply lowering an upside-down last onto the support. These two features facilitate the incorporation of the present invention in an automatic assembly line having a means to "drop" a last onto the last support and means for picking up the last from the support at the completion of a cycle. As is evident from the foregoing description, after the completion of a cycle the last merely rests by gravity upon the last support. Thus, any apparatus for inserting and removing of the lasts could be of relatively simple design.

Having thus described our invention, what we claim as new and desire to secure by Letters Patent of the United States is:

1. An automatic roughing machine comprising a roughening drum, said drum comprising rotatable cutter discs and non-rotating gauge vanes, means for selectively varying the heightwise distance between the work-engaging edges of said discs and said vanes, means for rotating the cutter discs, means for reciprocating the drum, and means for causing relative movement of the drum in a direction normal to the axis of the discs across a surface to be roughened.

2. An automatic roughing machine comprising a roughening drum, means for rotating the drum about its axis, means for reciprocating the drum axially, means for oscillating the drum about an axis normal to the axis of the drum, and means for moving a last carrying an upper to be roughened laterally into engagement with the roughening drum.

3. An automatic roughing machine comprising a roughing drum, means for rotating the drum about its axis, means for reciprocating the drum axially, means for oscillating the drum about an axis normal to the axis of the drum, means for mounting a last having an upper thereon for engagement with the drum, and means for moving the last mounting laterally into operative position relative to the drum.

4. The invention according to claim 3 in which the mounting means comprises a last support, and means for locking the last on the support.

5. An automatic roughing machine comprising a roughening drum, means for rotating the drum, means for reciprocating the drum, mounting means for mounting a last having an upper thereon comprising a last support and means for locking the last on the support, and means for yieldably urging the last support vertically toward the drum during a roughing operation.

6. An automatic roughing machine comprising a roughening drum, means for rotating the drum, means for reciprocating the drum, mounting means for mounting a last having an upper thereon, means for moving the last mounting laterally into operative position relative to the drum, means for yieldably urging the last mounting toward the drum during a roughing operation, and means for automatically removing the last mounting from a roughing position upon completion of the roughing of the trailing end of the upper.

7. The invention according to claim 3 in which the moving means includes means for advancing the mounting means quickly toward the abrasive drum and means for braking such movement prior to engagement of the mounting means with the drum thereby to effect passage of the mounting means by the drum at a slower rate of speed than the speed with which the mounting means advances toward the drum.

8. An automatic roughing machine comprising a roughening drum, means for rotating the drum about its axis, means for oscillating the drum about an axis normal to the axis of the drum, and means for moving a last carrying an upper to be roughened into engagement with the roughening drum.

9. An automatic roughing machine comprising a roughening drum rotatable about its axis, means for oscillating the drum about an axis normal to the axis of the drum, means for selectively varying the extent of the oscillating motion of the drum, and means for moving a last carrying an upper to be roughened into engagement with the roughening drum.

10. An automatic roughing machine comprising a roughening drum, means for reciprocating the drum axially, means for selectively varying the extent of the reciprocating motion, means for oscillating the drum about an axis normal to the axis of the drum, and means for moving a last carrying an upper to be roughened into engagement with the roughening drum.

11. An automatic roughing machine comprising a roughening drum, means for reciprocating the drum axially, means for oscillating the drum about an axis normal to the axis of the drum, said oscillating means being in timed relationship with said reciprocating means, and means for moving a last carrying an upper to be roughened into engagement with the roughening drum.

(References on following page)

References Cited by the Examiner

UNITED STATES PATENTS

| | | | |
|---|---|---|---|
| 1,922,498 | 8/1933 | Peterson et al. | 51—32 |
| 2,544,880 | 3/1951 | Hindle et al. | 69—6.5 |
| 2,606,404 | 8/1952 | Seminara | 51—102 |
| 2,741,073 | 4/1956 | Schwabe | 51—128 |
| 2,752,772 | 7/1956 | Hlobil | 69—6.5 |
| 2,821,813 | 2/1958 | Degler | 51—32 X |
| 2,873,557 | 2/1959 | Markle | 51—33 |

JORDAN FRANKLIN, *Primary Examiner.*

FRANK J. COHEN, *Examiner.*

A. R. GUEST, *Assistant Examiner.*